Jan. 10, 1933.  B. DE MATTIA  1,893,762
VULCANIZING APPARATUS
Filed Aug. 2, 1929   2 Sheets-Sheet 1
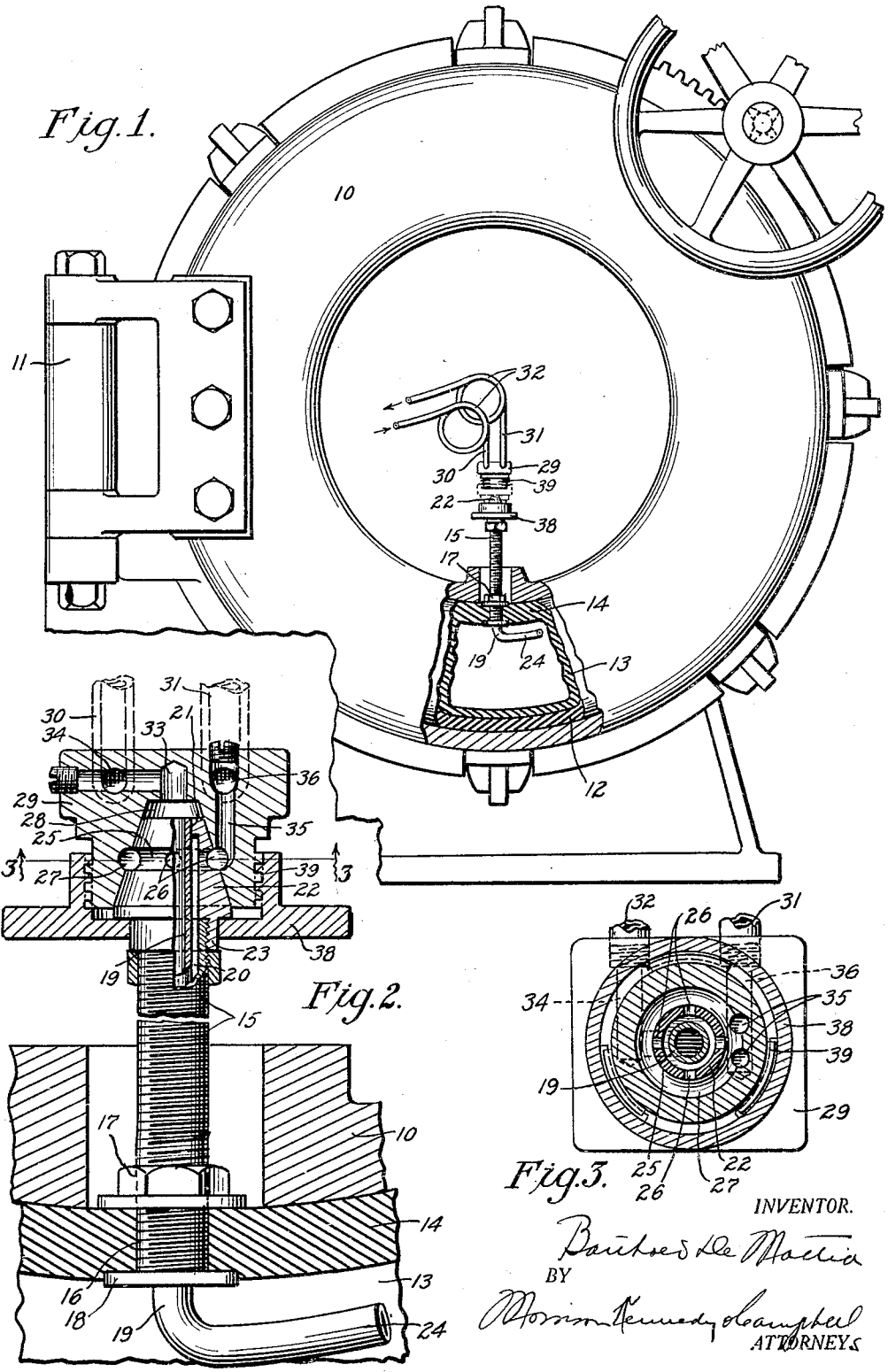

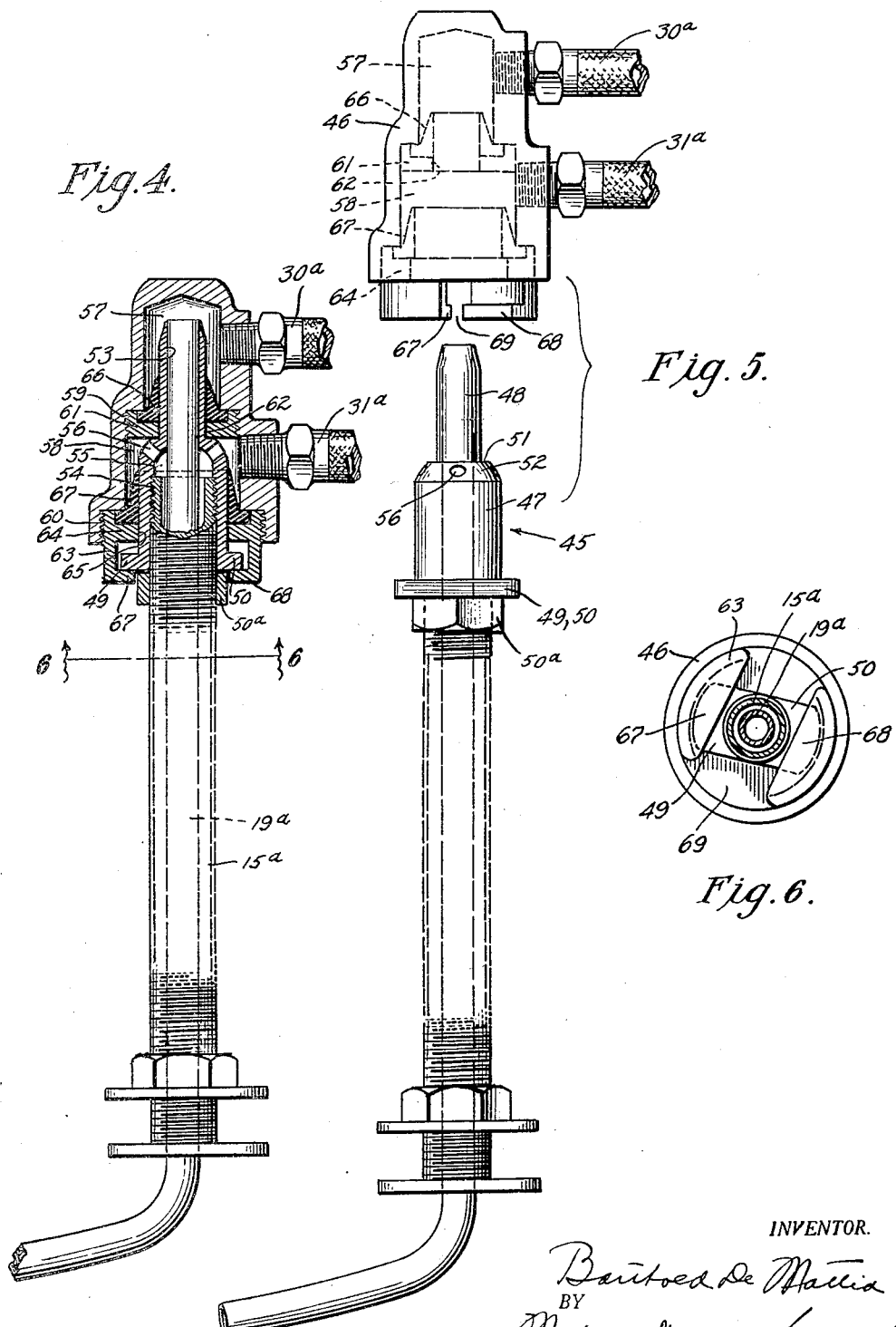

Patented Jan. 10, 1933

1,893,762

UNITED STATES PATENT OFFICE

BARTHOLD DE MATTIA, OF PASSAIC, NEW JERSEY

VULCANIZING APPARATUS

Application filed August 2, 1929. Serial No. 383,122.

This invention relates to vulcanizing apparatus, and is directed more particularly to an improved coupling for making connection between an inflatable member and the supply and exhaust pipes of a fluid circulating system.

In accordance with one method of vulcanizing or curing pneumatic tires, an inflatable former, known as a water bag, is placed within the tire to expand it within a mold while it is subjected to heat and pressure, and hot water, as the inflating medium, is circulated through the bag at a speed sufficient to maintain a substantially uniform temperature in all parts of the tire. Heretofore, the water bags which have been used for this method have been provided with two valve stems disposed at diametrically opposite points in the inner periphery of the bag, one being connected to a water supply pipe, and the other to a drain or exhaust pipe. The use of two such valve stems, however, has given rise to objections, in that they stiffen the water bag, render it more costly than if only one were used, and they require two separate manual operations in connecting the bag with and disconnecting it from the pipes before and after each vulcanizing operation.

An important object of the present invention, in its broader aspects, is to provide a water bag with a single valve stem having separate inlet and outlet passages and which may be quickly connected with both the supply and the exhaust pipes simultaneously.

Accordingly, the improved valve stem is made up of a tubular member extending through and anchored in the inner wall of the water bag, and another tubular member extending through the first. These two tubular members are of different diameters so that there is an annular fluid passage defined between them, and they are connected together at their outer ends by a coupling member which prevents direct communication between said annular passage and the interior of the inner tube. The inner end of the inner tubular member extends beyond the inner end of the outer tubular member and is offset in such a way as to direct incoming water away from the end of said outer tube.

The coupling member alluded to is in the nature of a conical plug which is adapted to be received in a correspondingly shaped socket in a fitting associated with the water supply and drain pipes on or adjacent to a vulcanizing mold. This conical plug is provided with an annular groove and a plurality of radial ports, which latter provide communication between the groove and the annular passage defined between the two tubes. The socket also has an annular groove adapted to register with that in the plug, and with which a suitable port communicates with the drain pipe. In the bottom of the socket, there is another port connected with the water supply pipe, and which is adapted to communicate with the interior of the inner tubular member of the coupling. A quickly detachable connection is provided for clamping the plug member in the socket, and by virtue of this arrangement, both the water supply and drain pipes can be simultaneously connected with and disconnected from the air bag.

In another form of the invention, the metal to metal contact, which obtains between the tapered plug and the socket, is done away with, and in lieu thereof, the socket member is internally provided with packing rings which are adapted sealingly to engage cylindrical portions of the plug. The pressure of the fluid circulating through the coupling acts upon these packing rings in such a way as to effect the sealing engagement previously alluded to.

The foregoing and other objects, features, and advantages of the invention will be readily appreciated from the following description in connection with the accompanying drawings, wherein two forms of the invention have been shown by way of illustration, and wherein Fig. 1 is an elevation, partly in section, of a vulcanizing mold equipped with the novel curing connection of this invention;

Fig. 2 is a vertical longitudinal sectional view through the curing connection, on a larger scale;

Fig. 3 is a transverse sectional view approximately on line 3—3 of Fig. 2, looking upwardly or in the direction of the arrows;

Fig. 4 is a longitudinal sectional view through a modified form of coupling;

Fig. 5 is an elevation showing the coupling members of Fig. 4 disconnected; and

Fig. 6 is a transverse section on line 6—6 of Fig. 4, showing more clearly the quickly detachable connecting means.

Referring particularly to Figs. 1 to 3 inclusive of the drawings, one form of the invention will be seen as applied to a vulcanizer of the type known as a watch-case heater, but it may be used with equal advantage in other types of vulcanizers. The watch-case heater comprises a pair of annular mold sections 10 hingedly connected together at 11, and provided with cavities in their meeting faces within which a tire 12 is confined during a vulcanizing operation. The tire 12 is subjected to pressure by being expanded against the walls of said cavities by a water bag 13, which, as is well known to those skilled in the art, consists of a hollow annular rubber bag with an inner peripheral or base wall 14 adapted to fill the space between the beads of the tire.

A threaded tubular member 15, such as is known in the art as a valve stem, extends through an opening 16 in the base wall 14 of the bag, said tubular member being anchored in place as by a clamping nut 17 which exerts pressure on the wall 14 against a base portion 18 at the inner end of the tube. Extending concentrically through said tubular member 15 is an inner tube 19, the outside diameter of which is less than the inside diameter of the tube 15, whereby to define between these two tubes an annular passage 20. The outer end of the inner tube 19 is secured, as by brazing, welding, or otherwise, in an opening 21 of a tapered plug 22, which has at its lower end an internally threaded skirt 23 for connection with the outer end of the valve stem or tube 15. Thus, the tubes 15 and 19 are properly related to each other and connected together as a unit, without allowing any direct communication between the inside of the inner tube 19 and the annular passage 20 surrounding it. The inner end of the tube 19 extends into the interior of the water bag 13 a substantial distance beyond the base portion 18 of the tube 15, and is bent at substantially a right angle, as at 24, so as to direct incoming water away from the said base portion.

Intermediate its ends, the tapered plug member 22 is formed with an annular groove 25, from which one or more radial ports 26 enter the annular passage 20 near its outer end. This groove 25 is adapted to register with another groove 27 formed in the wall of a tapered recess or socket 28 in a fitting 29 within which the plug 22 is adapted to be seated tightly. The fitting 29 is mounted on the ends of a water supply pipe 30 and an exhaust or drain pipe 31, said pipes having portions which are looped, as at 32, or otherwise arranged to permit a certain amount of flexibility.

At the bottom of the recess or socket 28, the fitting 29 presents a bore 33 communicating through one or more ports 34 with the inlet pipe 30, so that incoming water will be supplied to the inner tubular member 19 of the coupling. The annular groove 27 in the wall of the socket communicates with the exhaust or drain pipe 31 through one or more longitudinal ports 35 and a transverse port 36, so as to connect said drain pipe with the annular space or passage 20 when the coupling is made. Thus, hot water from the supply pipe 30 will enter the water bag 13 through the offset end 24 of the tube 19, and after circulating through the bag, the water will pass out to the exhaust pipe 31 through the passage 20.

A clamping member 38 is freely rotatable on the outside of the skirt portion 23 of the plug, and is provided with an interrupted thread or the like at 39 for engaging a co-operating portion of the fitting 29, to facilitate quick making and breaking of the joint. Of course, other specific forms of quickly detachable clamping means may be employed.

When the invention is used in a vertical watch-case heater as shown in the drawings, the coupling will preferably be disposed at the lower side of the mold, whereby to effect the best circulation of the water. In such case, the hot water entering through the tube 19 tends to rise to the upper portions of the mold, displacing the cooled water and forcing out through the passage 20. As the tire 12 and bag 13 are placed in the vulcanizer, the stem 15 and plug 22 are laid to register through a suitable opening or slot in the mold wall, locating the plug adjacent to the fitting 29. All that the operator has to do then to make the connection is to move down the fitting 29 so that the plug enters the socket 28, and then turn the clamping member 38 sufficiently to effect the connection between the plug 22 and the fitting 29. Thus, both pipes 30 and 31 are connected to the bag in half the time heretofore required.

Another form of the invention is shown in Figs. 4 to 6 inclusive. In this embodiment, the tubes 15ª and 19ª are concentrically related as in the first-described form, and connected together through the medium of a plug member 45 which is adapted to be received in a socket 46. The plug member 45 comprises a cylindrical body portion 47 having a central longitudinal extension 48 at its upper or outer end, and having lateral flange portions 49 and 50 at its other end. At its junction with the extension 48, the body portion 47 has an annular shoulder 51, part of which is beveled off as at 52. The extension 48 is formed with a central bore 53 within which one end of the central tube 19ᵃ is secured, and the extremity of the extension 48 is chamfered or beveled to facilitate its ready insertion in the socket member 46, as will later be apparent. The body portion 47 is formed with a counterbore and is screw-threaded at 54 for connection with the upper or outer end of the stem or tube 15ᵃ, and the proportions of the parts are such that an annular space or chamber 55 is provided between the bottom of the counterbore and the end of the tube 15ᵃ. Extending diagonally through the wall of the plug body 47 from the beveled portion 52 and into said annular chamber 55, there are a plurality of ports 56 through which the water is adapted to flow to the outlet pipe. A lock nut 50ᵃ is threaded on the stem 15ᵃ and jammed against the lower face of flanges 49 and 50 whereby to hold the plug member securely on the stem, yet allowing for adjustment of the plug longitudinally with reference to the stem.

The socket member 46 is substantially cylindrical in general outline and has an inner bore 57, an intermediate counterbore 58, the bottom of which is screw-threaded at 59, and an outer screw-threaded counterbore 60, as best shown in Fig. 4. Disposed in said threaded portion 59 of the intermediate counterbore 58 is a disc 61 having a central aperture 62 of a diameter equal to the outside diameter of the plug extension 48, so that when the plug member is in place, said disc 61 constitutes in effect a partition wall between inlet and outlet chambers formed respectively by the bore 57 and counterbore 58. Inward movement of the plug in the socket is limited by the abutment of the shoulder 51 against the disc 61. Seated in the threaded counterbore 60 is a thimble 63 which is provided, intermediate its ends, with an inwardly extending annular flange 64 having a central aperture 65 of a diameter equal to the exterior of the plug body 47.

In order to effect a seal and thereby prevent leakage of water past the walls of the apertures 62 and 65, rubber or other yielding packing rings 66 and 67 are provided respectively to engage the outside of the extension 48 and body portion 47. These packing rings are clamped in position respectively by the disc 61 and thimble 63, and they preferably have their inner ends beveled in such a manner that the pressure of the water in the coupling will force the engaging portions of the packing rings tightly against the adjacent portions of the plug member.

The water supply pipe 30ᵃ is connected with the socket member to communicate with the inner bore 57, while the drain or outlet pipe 31ᵃ is connected to communicate with counterbore 58. The length of the extension 48 is less than the depth of the chamber 57 so that the water can flow into the tube 19ᵃ, and the ports 56 serve to establish communication between the chambers 55 and 58.

At its lower or outer end, the thimble 63 is provided with inwardly extending flanges 67 and 68 which are separated from each other by a diametrical slot 69 (Fig. 6) of a width slightly greater than the width of the flanges 49 and 50 of the plug. Thus to make the connection it is merely necessary to register the slot 69 with the flanges 49 and 50 and push the plug into the socket so that the flanges 49 and 50 are between the flange 64 and flanges 67 and 67. By then turning the socket member slightly with reference to the plug, the coupling is made and double flow established between the interior of the water bag and the pipes 30ᵃ and 31ᵃ. In its mode of operation, this form of the invention is like that of the first-described embodiment.

From the foregoing it will be evident that an improved hydraulic coupling has been provided for vulcanizing molds, which is of simple construction, and capable of quick operation. The invention is susceptible of numerous modifications in the details of construction and arrangement of parts, and the right is reserved to make such changes as fall within the scope of the appended claims without departing from the spirit of the invention.

While the improved coupling has been herein shown as applied to a water bag, such as is used in the vulcanization of tires, it is equally applicable to other inflatable members, such as tires themselves (as for instance when the latter are vulcanized by the admission of hot water directly thereinto, in which case the space between the beads of a tire is closed by a sealing ring carrying the inflating connection).

Having thus described my invention, what I claim is:

1. A double-flow conduit for the circulation of an inflating fluid through an inflatable former, said conduit comprising a stem portion and a detachable cap portion, the stem portion consisting of concentric tubes connected together and forming separate fluid passages through the stem, means for attaching the stem portion to the inflatable former, and means associated with the stem portion for forming a fluid-tight mating connection with the cap portion and having separate ports communicating with the separate fluid passages, said cap portion being formed with separate passages leading from exhaust and supply pipes and adapted to communicate separately with ports of the stem mating means to provide communication between the supply and exhaust pipes and the separate fluid passages of the stem portion, and quick detachable means for holding the stem portion and the cap portion in mating relation.

2. A double-flow conduit for the circulation of an inflating fluid through an inflatable former, said conduit comprising a stem portion and a detachable cap portion, the stem portion consisting of two concentric tubes connected together to form two separate fluid passages through the stem, means for attaching the stem at one end to the inflatable former, and a tapered plug secured to the stem at its opposite end to form a fluid-tight connection with the cap portion, said tapered plug being formed with separate ports communicating with the separate fluid passages of the stem, said cap portion having a tapered socket to receive the tapered stem plug and formed with separate passages leading from exhaust and supply pipes and adapted to align with the ports of said plug to provide communication between the supply and exhaust pipes and the separate fluid passages of the stem, and quick detachable means for holding the stem portion and the cap portion in mating relation.

3. A double-flow conduit for connecting an inflatable former to separate supply and exhaust pipes, said conduit consisting of a stem portion and a cap portion, the stem portion comprising two concentric tubes secured together and spaced apart to form two separate fluid passages and provided at its outer end with a tapered plug adapted to be inserted into the cap portion to form a fluid-tight connection therewith, said tapered plug being formed with a radial port communicating with one of the fluid passages and an axial port communicating with the other of said passages, and the cap portion being formed with a tapered socket adapted to fit over the tapered plug of the stem portion, said socket having an annular groove adapted to align with the radial port of the tapered plug to form a fluid-tight passage, a port formed at the base of the socket, a fluid passage in the cap portion communicating with the annular socket groove, and another fluid passage in the cap portion communicating with the port at the base of the socket, said fluid passages leading to exhaust and supply pipes, and means for quickly attaching the cap portion to the stem portion to form a fluid-tight connection between the two, said attaching means being such as properly to align the fluid passages and ports of the cap portion with those of the tapered plug of the stem portion whereby to provide two separate communicating passages between the tubes of the stem and the exhaust and supply pipes.

4. A double-flow conduit for the circulation of an inflating fluid through an inflatable former, said conduit comprising a stem portion having means for permanently attaching it to the inflatable former, a cap portion adapted to be detachably connected to the stem portion, and quick detachable means for holding the cap portion in fluid-tight engagement with the stem portion, said stem portion being made up of two concentric tubes integrally joined at their outer ends and spaced apart inwardly of said ends to provide a passage extending through the inner tube and a second passage between the tubes, and said stem portion being provided at its outer end with a tapered plug formed with a radial port in communication with the outer fluid passage, and said cap portion being formed with a tapered socket adapted to fit over the tapered plug of the stem portion and having an annular groove adapted to align with the radial port of the plug, said cap portion having one fluid passage adapted to communicate with the inner fluid passage of the stem portion and to connect the same with a supply pipe, and a second fluid passage adapted to communicate through the aforesaid radial port and annular groove with the outer fluid passage of the stem portion and to connect the same with an exhaust pipe.

In testimony whereof, this specification has been duly signed by:

BARTHOLD DE MATTIA.